UNITED STATES PATENT OFFICE.

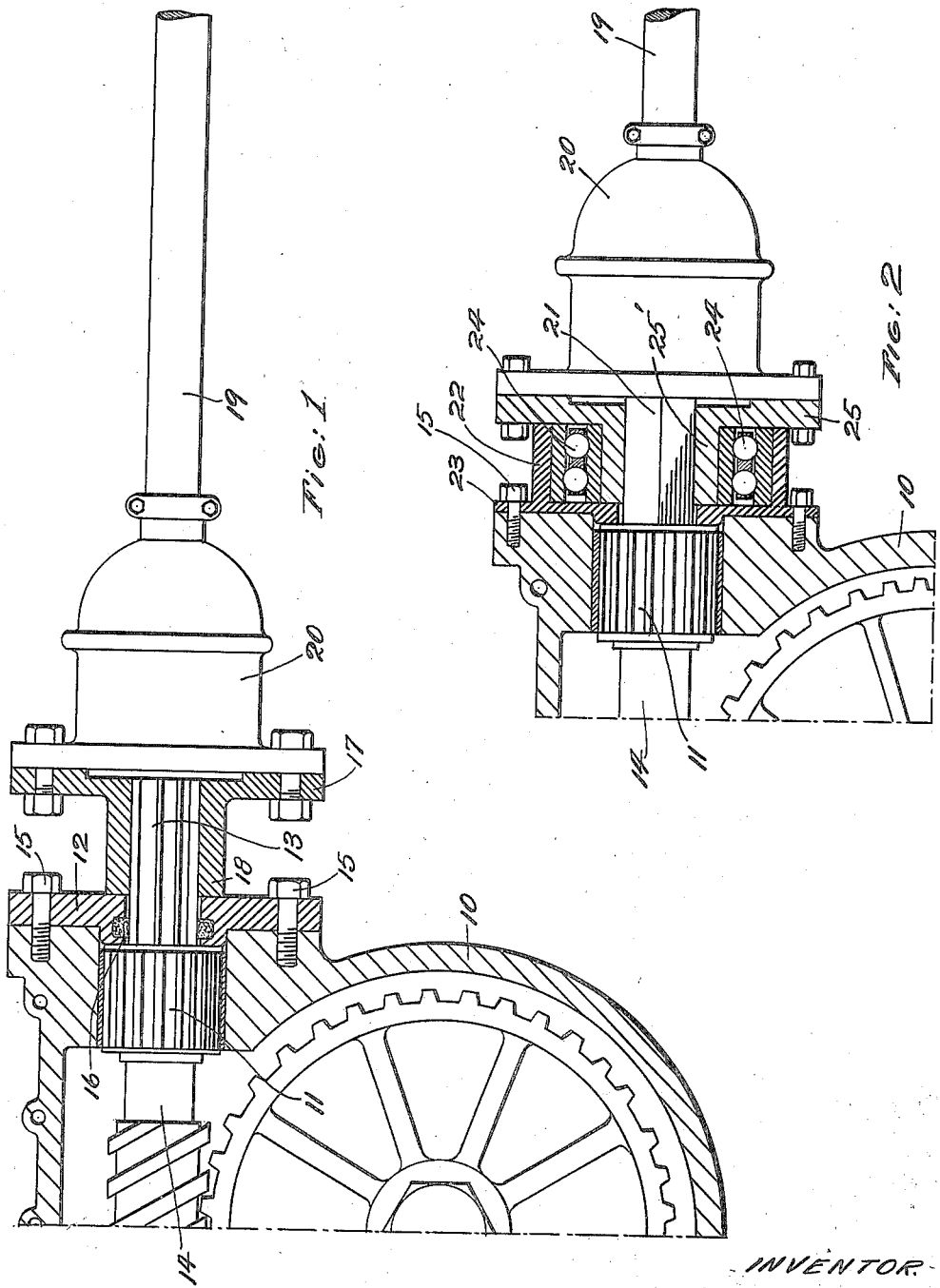

WILLIAM F. HUDSON, OF PHILADELPHIA, PENNSYLVANIA, ASSIGNOR TO HUDSON MOTOR SPECIALTIES COMPANY, OF PHILADELPHIA, PENNSYLVANIA, A CORPORATION OF PENNSYLVANIA.

PROPULSION CONNECTION FOR MOTOR-VEHICLES.

1,341,616.  Specification of Letters Patent.  Patented May 25, 1920.

Application filed May 15, 1919. Serial No. 297,425.

*To all whom it may concern:*

Be it known that I, WILLIAM F. HUDSON, a citizen of the United States, residing at the city of Philadelphia, county of Philadelphia, and State of Pennsylvania, have invented a certain new and useful Improved Propulsion Connection for Motor-Vehicles, of which the following is a specification.

This invention, generally stated, relates to motor-vehicle constructions and has more particular relation to means for securing propulsion means with respect to the worm-drive of a truck. It is customary in the construction of worm-driven trucks of certain models, to couple the power transmission direct to the worm-shaft by means of a propeller shaft rigidly connected fore and aft and rigid throughout its length. Such propeller is contained within a casing which is bolted at one end to the housing or casing containing the worm-drive and is bolted at its other end to the transmission casing. Consequently the entire connection between the transmission and the worm-drive possesses no flexibility. Rigidity of connection is very undesirable for various reasons. As an illustration:—In backing a truck for loading or unloading purposes the rear wheels thereof frequently come in contact with a curb or the like and the jar or jolt resulting from such impact is referred to various portions of truck mechanism, causing disalinement, stress, strains and frequently breakage of parts.

It may be said to be a leading object of the present invention to provide a propulsion connection possessed of such flexibility that jars and jolts as may be referred from the rear axle are absorbed by the propulsion means without detrimental effect to the vehicle mechanism. Another object is that of utilizing the worm drive and its casing as manufactured and connecting with respect thereto comparatively few and simple elements for attaining the results recited by the leading object whereby unskilled labor may readily effect a substitution of parts. Other and further objects relate to the provision of flexible propulsion means connected in a new and novel manner with a worm-drive in which connection is combined efficiency, practicability and comparative cheapness with the end in view of commercially bettering truck construction.

The invention consists of the improvements hereinafter described and finally claimed.

The nature, characteristic features and scope of the invention will be more fully understood from the following description taken in connection with the accompanying drawings forming part hereof, and in which:—

Figure 1, is a view in side elevation, partly sectioned, illustrating a connection of worm-drive and propulsion means embodying features of the present invention, and Fig. 2, is a similar view of a slightly modified form of construction.

For the purpose of illustrating my invention, I have shown in the accompanying drawings two forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and decribed.

In practising the present invention I first disconnect from between the worm-drive housing and the transmission casing of a commercial vehicle, of certain model, the propeller shaft casing and then disconnect the propeller shaft from between the worm-shaft and the power transmission. This propeller shaft is of the rigidly connected type and has splined-joint relation with the worm-shaft. With such propeller shaft and its casing removed there is left protruding from the worm-drive housing 10 the splined end of the worm-shaft. It is this projecting end of the worm-shaft with which the removed propeller shaft had splined-joint relation.

Referring now more particularly to Fig. 1 of the drawings the roller bearings 11, in which the worm-shaft is rotatably mounted, are calculated to support or sustain the improved propulsion connection without resort to additional bearings. In order to prevent dust and dirt gaining access to the bearings 11 and to prevent the egress of lubricant from the worm-drive housing 10, a disk-like plate 12 having a central aperture therethrough is fitted over the splined end 13 of worm-shaft 14 and is clamped to housing 10 as by bolts 15. In practice the same bolts are employed by which the propeller casing was secured to place. The plate 12 is preferably provided with a washer 16 of felt or equivalent material. I next fit over the projected end of the worm-shaft a disk-like plate 17 having an elongated sleeve 18 projected therefrom there being a grooved passage therethrough for coöperatively engaging with the splined portion of said worm-shaft so that the same may rotate in unison. The end of sleeve 18 abuts against the plate 12. To plate 17 is now clamped the propelling means which may comprise a propeller shaft 19 provided with a universal joint 20.

Referring now to Fig. 2, of these drawings it may be found that the roller bearings 11 are not sufficient to bear the weight of my improved propulsion connection in which event an additional bearing is provided for the extended end of the worm-shaft. Also it may be found that the shaft-end is not splined but has a plain cylindrical surface or else a squared end. I have shown in the drawings a squared end 21. Carried by the housing 10 is a tubular member 22 having a flanged portion 23, bolts passing through said flanged portion for clamping said member to said housing. The part 23 functions as does plate 12 in Fig. 1, that is, it prevents ingress of dust and dirt and prevents egress of lubricant. Fitted within said member is a bearing 24 of any desired type. The sleeve 25' of a disk-like plate 25 which has a squared opening therethrough is fitted over the squared end of the worm-shaft so that said plate is in abutting relation with an end of said bearing and the free end of member 22. The propelling means, as a propeller shaft, is clamped to the plate 25. Obviously if the projected end of the worm shaft is of cylindrical form, plate 25 may be fixed in any appropriate manner as by a pin with respect to said shaft.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What I claim is:

1. In a construction of the character stated a worm and its complemental shaft, a housing therefor said shaft being projected therethrough, a bearing for said shaft mounted in said housing a member provided with a sleeve for co-actively engaging over a portion of the projected end of said shaft so as to rotate in unison therewith, a dust-guard interposed between said housing and the free end of said sleeve, and propelling means fixed to said member.

2. In a construction of the character stated a worm and its complemental shaft, a housing therefor said shaft being projected therethrough, a dust guard having a sleeve fixed to said housing, a bearing in said sleeve, a member provided with a sleeve for co-actively engaging over a portion of the projected end of said shaft and rotatable in unison with said shaft in said bearing and propulsion means fixed to said member.

In testimony whereof I have hereunto signed my name.

WILLIAM F. HUDSON.